United States Patent
Warlick et al.

(10) Patent No.: US 11,467,052 B2
(45) Date of Patent: Oct. 11, 2022

(54) SYSTEM AND METHOD FOR DETECTING FAULTY ENGINE ANTI-ICE SENSOR

(71) Applicant: The Boeing Company, Chicago, IL (US)

(72) Inventors: Sean Patrick Warlick, Seattle, WA (US); Daniel Volk, Seattle, WA (US); Omid B. Nakhjavani, Kirkland, WA (US); Catherine Crandall, Renton, WA (US)

(73) Assignee: The Boeing Company, Chicago, IL (US)

( * ) Notice: Subject to any disclaimer, the term of this patent is extended or adjusted under 35 U.S.C. 154(b) by 767 days.

(21) Appl. No.: 16/423,640

(22) Filed: May 28, 2019

(65) Prior Publication Data

US 2020/0378856 A1 Dec. 3, 2020

(51) Int. Cl.
*G01L 27/00* (2006.01)
*G01L 13/00* (2006.01)

(52) U.S. Cl.
CPC ............ *G01L 27/007* (2013.01); *G01L 13/00* (2013.01)

(58) Field of Classification Search
CPC ............................... G01L 27/007; G01L 13/00
See application file for complete search history.

(56) References Cited

U.S. PATENT DOCUMENTS

| | | | | |
|---|---|---|---|---|
| 2006/0184309 A1* | 8/2006 | Hasegawa | ............. | G01L 27/007 701/114 |
| 2012/0033205 A1* | 2/2012 | Awaji | .................... | G01L 11/025 356/73.1 |
| 2014/0336872 A1* | 11/2014 | Howard | .................... | B64F 5/60 701/33.7 |
| 2020/0240867 A1* | 7/2020 | Sur | .......................... | A24F 40/50 |
| 2020/0300111 A1* | 9/2020 | Hussain | ................... | G01M 3/24 |

* cited by examiner

*Primary Examiner* — Randy W Gibson
*Assistant Examiner* — John M Royston
(74) *Attorney, Agent, or Firm* — Parsons Behle & Latimer

(57) ABSTRACT

A system and method for detecting faulty engine anti-ice sensor is disclosed and may include obtaining first pressure data representing a first pressure over a period of time at a first engine anti-ice pressure sensor on an aircraft engine. The method may further include obtaining second pressure data representing a second pressure over the period of time at a second engine anti-ice pressure sensor on the aircraft engine. The method may also include generating a variance value based at least partially on a variance of a difference between the first pressure data and the second pressure data. The method may include providing an indication that liquid is within the first engine anti-ice pressure sensor or the second engine anti-ice pressure sensor when the variance value exceeds a threshold.

20 Claims, 9 Drawing Sheets

SYSTEM AND METHOD FOR DETECTING FAULTY ENGINE ANTI-ICE SENSOR

FIELD OF THE DISCLOSURE

This disclosure is generally related to fault detection, and in particular to detecting a faulty engine anti-ice sensor.

BACKGROUND

Aircraft engines may include sophisticated engine anti-ice systems to prevent ice from building up on and within the engine. The systems may route hot engine bleed air to portions of the engine that are susceptible to freezing, such as an inlet cowl, to prevent ice buildup. Various valves, temperature sensors, and pressure sensors may be used to perform the routing and to regulate the flow of bleed air through the engine anti-ice system.

Water, or other fluid, within the engine anti-ice sensors, such as the pressure sensors, can cause erroneous readings and may trigger long fault-isolation procedures. Typical fault isolation procedures may include systematically removing and inspecting components from the engine, resulting in significant maintenance costs and downtime. Other disadvantages may exist.

SUMMARY

Disclosed herein is a system and method for detecting a faulty engine anti-ice engine sensor that may reduce the maintenance costs and downtime associated with typical methods of detecting and locating faulty sensors. In an embodiment, a method includes obtaining first pressure data representing a first pressure over a period of time at a first pressure sensor on an aircraft engine. The method further includes obtaining second pressure data representing a second pressure over the period of time at a second pressure sensor on the aircraft engine. The method also includes generating a variance value based at least partially on a variance of a difference between the first pressure data and the second pressure data. The method includes providing an indication that liquid is within the first pressure sensor or the second pressure sensor when the variance value exceeds a threshold.

In some embodiments, the method includes calculating a first variance of the first pressure data and a second variance of the second pressure data in response to the variance value exceeding the threshold and providing an indication that liquid is within the first pressure sensor when the first is greater than the second variance or providing an indication that liquid is within the second pressure sensor when the first variance is less than the second variance.

In some embodiments, generating the variance value includes generating pressure difference data representing the difference between the first pressure data and the second pressure data over the period of time. In some embodiments, generating the variance value includes generating a pressure difference distribution for the period of time based on the pressure difference data. In some embodiments, generating the variance value includes obtaining torque motor data representing current through a torque motor over the period of time and dividing a variance of the difference between the first pressure data and the second pressure data by a variance of torque motor data.

In some embodiments, the method includes generating the first pressure data and the second pressure data during a cruise portion of a flight. In some embodiments, generating the first pressure data and the second pressure data includes sampling the first pressure at the first pressure sensor and sampling the second pressure at the second pressure sensor at one second intervals. In some embodiments, the first pressure data and the second pressure data omit at least the first 3 minutes of a cruise portion of a flight.

In some embodiments, the method includes before providing the indication that liquid is within the first pressure sensor or the second pressure sensor, determining whether electrical current through a torque motor exceeds a threshold current for the period of time. In some embodiments, the method includes before providing the indication that liquid is within the first pressure sensor or the second pressure sensor, determining whether the first pressure data, the second pressure data, or both include a timestamp error.

In an embodiment, a system includes a processor and a memory storing instructions that, when executed by the processor, cause the processor to store first pressure data at the memory, the first pressure data representing a first pressure over a period of time at a first pressure sensor on an aircraft engine. The instructions further cause the processor to store second pressure data in the memory, the second pressure data representing a second pressure over the period of time at a second pressure sensor on the aircraft engine. The instructions also cause the processor to generate a variance value based at least partially on a variance of a difference between the first pressure data and the second pressure data. The instructions cause the processor to provide an indication that liquid is within the first pressure sensor or the second pressure sensor when the variance value exceeds a threshold.

In some embodiments, the instructions further cause the processor to calculate a first variance of the first pressure data and a second variance of the second pressure data in response to the variance value exceeding the threshold and to provide an indication that liquid is within the first pressure sensor when the first variance is greater than the second variance or to provide an indication that liquid is within the second pressure sensor when the first variance is less than the second variance.

In some embodiments, to generate the variance value the instructions further cause the processor to obtain torque motor data representing current through a torque motor over the period of time and divide the variance of the difference between the first pressure data and the second pressure data by a variance of torque motor data. In some embodiments, the first pressure data and the second pressure data omit at least the first 3 minutes of a cruise portion of a flight.

In some embodiments, the instructions further cause the processor to, before providing the indication that liquid is within the first pressure sensor or the second pressure sensor, determine whether an electrical current through a torque motor exceeds a threshold current for the period of time. In some embodiments, the instructions cause the processor to, before providing the indication that liquid is within the first pressure sensor or the second pressure sensor, determine whether the first pressure data, the second pressure data, or both include a timestamp error.

In an embodiment, a method includes obtaining first pressure data from a first engine anti-ice pressure sensor on a first side of an aircraft engine. The method further includes obtaining second pressure data from a second engine anti-ice pressure sensor on the first side of the aircraft engine. The method also includes generating a variance value based at least partially on a variance of a difference between the first pressure data and the second pressure data, wherein the variance value exceeding a threshold indicates liquid in the first engine anti-ice pressure sensor or the second engine anti-ice pressure sensor.

In some embodiments, the method includes, when the variance value exceeds the threshold, determining variances of the first data to determine whether the first engine anti-ice pressure sensor is faulty, and determining variances of the second pressure data to determine whether the second engine anti-ice pressure sensor is faulty. In some embodiments, generating the variance value includes obtaining torque motor data representing current through a torque motor and dividing a variance of the difference between the first pressure data and the second pressure data by a variance of torque motor data. In some embodiments, the first pressure data and the second pressure data correspond to a cruise portion of a flight.

Figure 1:
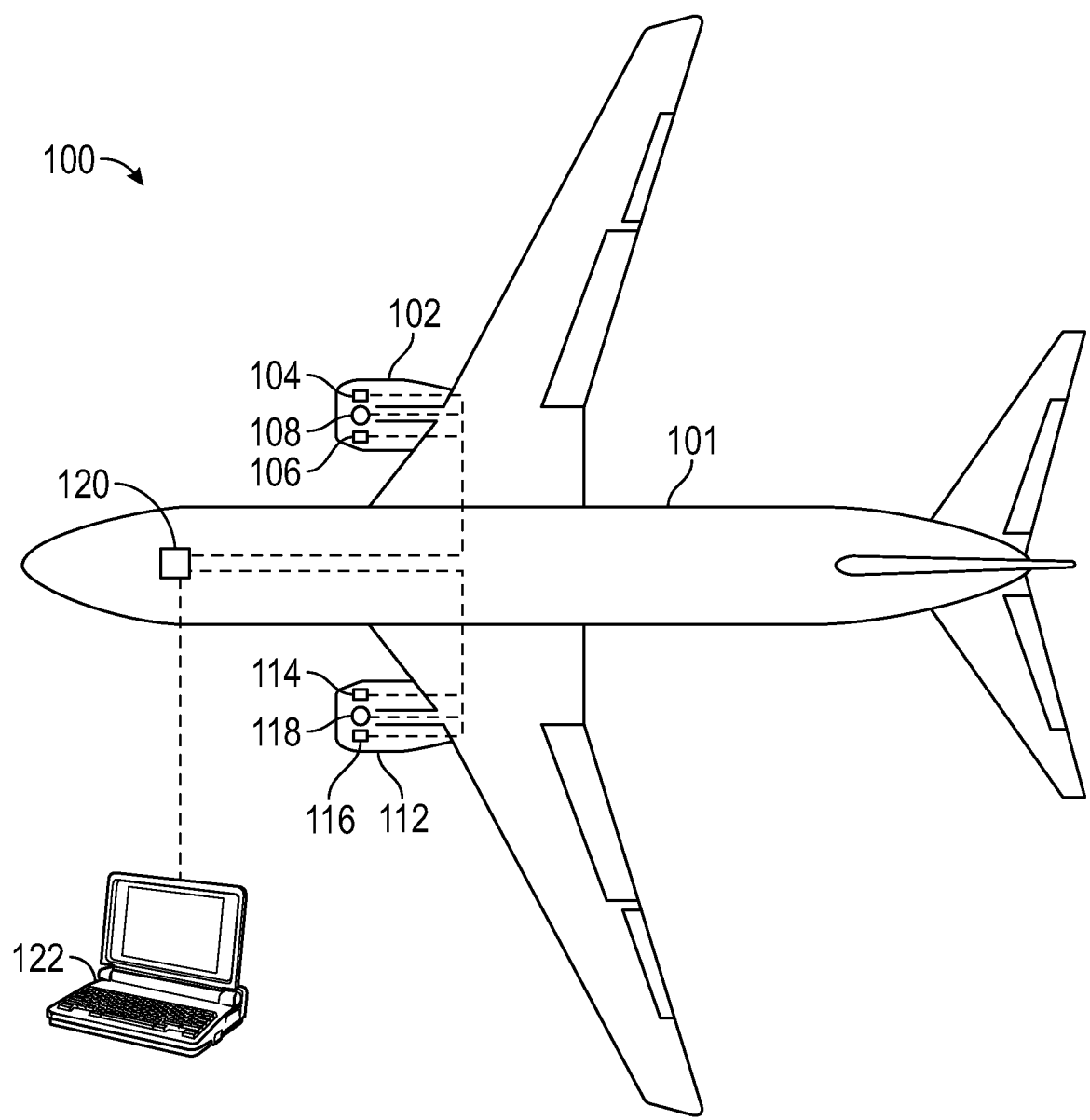
FIG. 1 depicts an embodiment of a system for detecting a faulty engine anti-ice sensor.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an embodiment of a system 100 for detecting a faulty engine anti-ice sensor is depicted. The system 100 may be incorporated into a vehicle such as an aircraft 101. However, although the system 100 is described with reference to vehicles, the system 100 may be incorporated into any application where detection of a faulty sensor would be beneficial. The aircraft 101 may include a first engine 102 and a second engine 112. Although, FIG. 1 depicts the aircraft 101 as including two engines, in practice, the aircraft 101 may include more or fewer than two engines.

The system 100 may include a first pressure sensor 104 and a second pressure sensor 106 both positioned at the first engine 102. The pressure sensors 104, 106 may be part of an engine anti-ice system for preventing ice buildup at the first engine 102 and may be used to provide data for regulating air flow within the first engine 102. Thus, the first set of pressure sensors 104, 106 may include any type of pressure sensor usable with engine anti-ice systems.

The exact positions of the first pressure sensor 104 and the second pressure sensor 106 may vary depending on a type of the first engine 102. In some embodiments, the first pressure sensor 104 may be at a first side (e.g., left) of the first engine 102 and the second pressure sensor 106 may be at a second side (e.g., right) of the first engine 102. Although FIG. 1 depicts two pressure sensors 104, 106 positioned at the first engine 102, in practice, the engine 102 may include more than two.

The system 100 may further include a first torque motor 108. The first torque motor 108 may be used to open and close valves associated with an engine anti-ice system. Data from the first torque motor 108 may be usable to determine whether an anti-ice system is in operation during a flight, as described further herein.

The first set of pressure sensors 104, 106 and the first torque motor 108 may be communicatively coupled to an on-board computing device 120. The on-board computing device 120 may be configured to retrieve and store data generated by the pressure sensors 104, 106 and the first torque motor 108.

The system 100 may also include a third pressure sensor 114 and a fourth pressure sensor 116 both positioned at the second engine 112. This second set of pressure sensors 114, 116 may be part of an engine anti-ice system for preventing ice buildup at the second engine 112 and may include any type of pressure sensor usable with engine anti-ice systems. As with the first set of pressure sensors 104, 106, locations of the third pressure sensor 114 and the fourth pressure sensor 116 may vary depending on a type of the second engine 112.

A second torque motor 118 may be positioned at the second engine 112 and may be part of an engine anti-ice system. For example, the second torque motor 118 may open and close valves for an engine anti-ice system.

The system 100 may further include a remote computing device 122. Calculations described herein, for example to determine whether one or more of the sensors 104, 106, 114, 116 is faulty, may be performed at either the on-board computing device 120, the remote computing device 122, or a combination of both. The on-board computing device 120 may be configured to retrieve data from each of the sensors 104, 106, 114, 116 and from each of the torque motors 108, 118. In embodiments where the remote computing device 122 is used to perform calculations, the on-board computing device 120 may collect and store the data (e.g., during flight) until it may be connected to the remote computing device 122 (e.g., upon landing).

During operation, the pressure sensors 104, 106, 114, 116 may collect pressure data and transmit the data to the on-board computing device 120. The on-board computing device 120 may perform calculations, as described herein, to determine whether one or more of the pressure sensors 104, 106, 114, 116 is producing erroneous data due to water, or another fluid, within the faulty pressure sensor. Alternatively, the on-board computing device 120 may store the data until it is communicatively coupled to the remote computer 122. At which time, the calculations may be performed at the remote computer 122.

A benefit of the system 100 is that by analyzing the data received from the pressure sensors 104, 106, 114, 116, the system 100 may reduce maintenance costs and downtime associated with troubleshooting and locating faulty sensors. Other advantages may exist.

Figure 2:
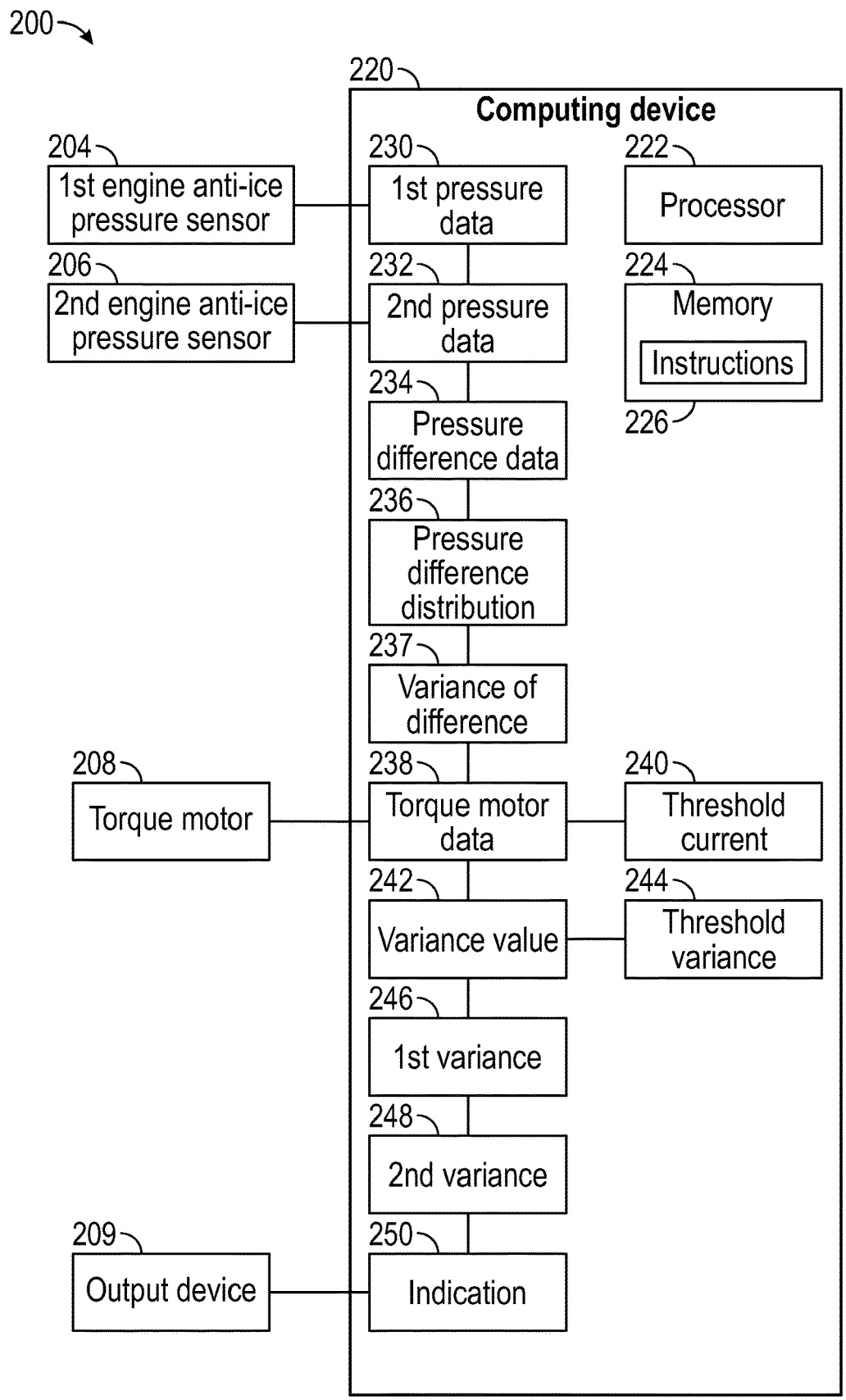
FIG. 2 depicts an embodiment of a system for detecting a faulty engine anti-ice sensor.

Referring to FIG. 2, a system 200 for detecting a faulty engine anti-ice sensor is depicted. The system 200 may include a first pressure sensor 204, a second pressure sensor 206, a torque motor 208, and a computing device 220. The pressure sensors 204, 206 and the torque motor 208 may correspond to either the first pressure sensor 104, the second pressure sensor 106, and the first torque motor 108 of FIG. 1 or the third pressure sensor 114, the fourth pressure sensor 116, and the second torque motor 118 of FIG. 1. The computing device 220 may correspond to either the on-board computing device 120 or the remote computing device 122.

The computing device 220 may include a processor 222 and a memory 224. The processor 222 may include a central processing unit (CPU), a graphical processing unit (GPU), a digital signal processor (DSP), a peripheral interface controller (PIC), or another type of microprocessor. It may be implemented as an integrated circuit, a field programmable gate array (FPGA), an application specific integrated circuit (ASIC), a combination of logic gate circuitry, other types of digital or analog electrical design components, or the like, or combinations thereof. In some embodiments, the processor 222 may be distributed across multiple processing elements, relying on distributive processing operations.

The memory 224 may include random-access memory (RAM), read-only memory (ROM), magnetic disk memory, optical disk memory, flash memory, another type of memory capable of storing data and processor instructions, or the like, or combinations thereof. In some embodiments, the memory 224, or portions thereof, may be located externally or remotely from the rest of the computing device 220. The memory 224 may store instructions 226 that, when executed by the processor 222, cause the processor 222 to perform operations. The operations may correspond to any operations described herein, including receiving data, processing the data, and providing output.

The computing device 220 may be configured to receive and store data, such as first pressure data 230 from the first pressure sensor 204, second pressure data 232 from the second pressure sensor 206, and torque motor data 238 from the torque motor 208. Based on the received data, the computing device may be configured to generate additional data, such as pressure difference data 234, a pressure difference distribution 236, a variance of the difference 237 between the first pressure data 230 and the second pressure data 232, a variance value 242, a first variance 246 of the first pressure data 230, a second variance 248 of the second pressure data 232, and an indication 250 that liquid is within one of the pressure sensors 204, 206. The computing device may further store a threshold current 240 and a threshold variance 244 for comparison purposes. Although depicted as separate from the memory 224, the first pressure data 230, the second pressure data 232, the pressure difference data 234, the pressure difference distribution 236, the torque motor data 238, the variance value 242, the first variance 246, the second variance 248, the indication 250, the threshold current 240, and the threshold variance 244 may be stored at the memory 224, or at another memory of the computing device 220 or external to the computing device 220.

During operation, the computing device 220 may receive the first pressure data 230 and the second pressure data 232. The first pressure data 230 may represent a first pressure over a period of time at the first pressure sensor 204. The second pressure data 232 may represent a second pressure over the period of time at the second pressure sensor 206. The period of time may correspond to a cruise portion of a flight. In some embodiments, the first pressure sensor 204 and the second pressure sensor 206 may sample their respective pressures at one second intervals. Further, the processor 222 may remove data that corresponds to a "bit check" that may be performed at the end of a climbing portion of a flight, since that data may include anomalies associated with the check. Thus, the processor may limit the first pressure data 230 and the second pressure data 232 to only those portions of the data that are sampled after at least the first three minutes of a cruise portion of a flight, while omitting the first three minutes. As another check, the processor 222 may determine whether the first pressure data 230 or the second pressure data 232, or both includes a timestamp error. This may be detected by comparing the number of data points included in the pressure data 230, 232 with the duration of the cruise portion of the flight. If there are more data points than should be possible within the cruise timeframe, then a timestamp error is likely, and the data may not be usable.

After the first pressure data 230 and the second pressure data 232 have been filtered as described above, the processor 222 may generate the pressure difference data 234, which represents a difference between the first pressure data 230 and the second pressure data 232 over the period of time. Based on the pressure difference data 234, the processor 222 may generate the pressure difference distribution 236, which may represent a model distribution of the pressure differences for the period of time. From the pressure difference data 234, the pressure difference distribution 236, or both, the variance of the difference 237 between the first pressure data 230 and the second pressure data 232 may be calculated.

The torque motor data 238 may also be received at the computing device 220. The torque motor data 238 may represent electrical current through the torque motor 208 over the period of time. A consistent electrical current may provide an indication that an engine anti-ice system is on. The processor 222 may determine whether the electrical current represented by the torque motor data 238 exceeds the threshold current 240 for the entire period of time. If the electrical current dips below the threshold current 240, then an engine anti-ice system may not have been on during the entire flight, and the first pressure data 230 and the second pressure data 232 may not be usable to determine whether liquid is present in either of the pressure sensors 204, 206.

General trends in the torque motor data 238 may be correlated to general trends in the pressure difference data 234. As such, the variance of the difference 237 may be normalized by dividing the variance of the difference 237 by a variance of the torque motor data 238 to derive a variance value 242. The variance value 242 may be based on the first pressure data 230 and the second pressure data 232 as normalized using the torque motor data 238 and may be usable to determine whether there is liquid in one of the pressure sensors 204, 206. For example, under normal conditions, the variance of the difference 237 between the pressure sensors 204, 206 should be low, meaning that the difference between readings on the pressure sensors 204, 206 is fairly constant. As such, when the variance value 242 is high, then one of the pressure sensors 204, 206 may be faulty, which is likely caused by liquid within the faulty sensor. Thus, the variance value 242 may be compared to a threshold variance 244 to determine whether one of the pressure sensors 204, 206 is faulty.

In response to the variance value 242 exceeding the threshold variance 244, the processor 222 may be configured to calculate a first variance 246 of the first pressure data 230 and a second variance 248 of the second pressure data 232. When the first variance 246 exceeds the second variance 248, the first engine anti-ice pressure sensor 204 may have liquid (e.g., water) in it and may be faulty. Likewise, when the second variance 248 exceeds the first variance 246, the second engine anti-ice pressure sensor 206 may have liquid in it and may be faulty. The processor 222 may be configured to provide an indication 250 that liquid is within the first engine anti-ice pressure sensor 204 or the second engine anti-ice pressure sensor 206 depending on which of the variances 246, 248 is greater.

The indication 250 may be output to a user via an output device 209, which may include a visual output device (e.g., a screen). In some embodiments, the indication 250 may be transmitted to another computing device or stored for further processing.

A benefit of the system 200 is that by analyzing the data received from the pressure sensors 204, 206, at the processor 222, the system 200 may reduce maintenance costs and downtime associated with troubleshooting and locating faulty sensors. Other advantages may exist.

Figure 3:
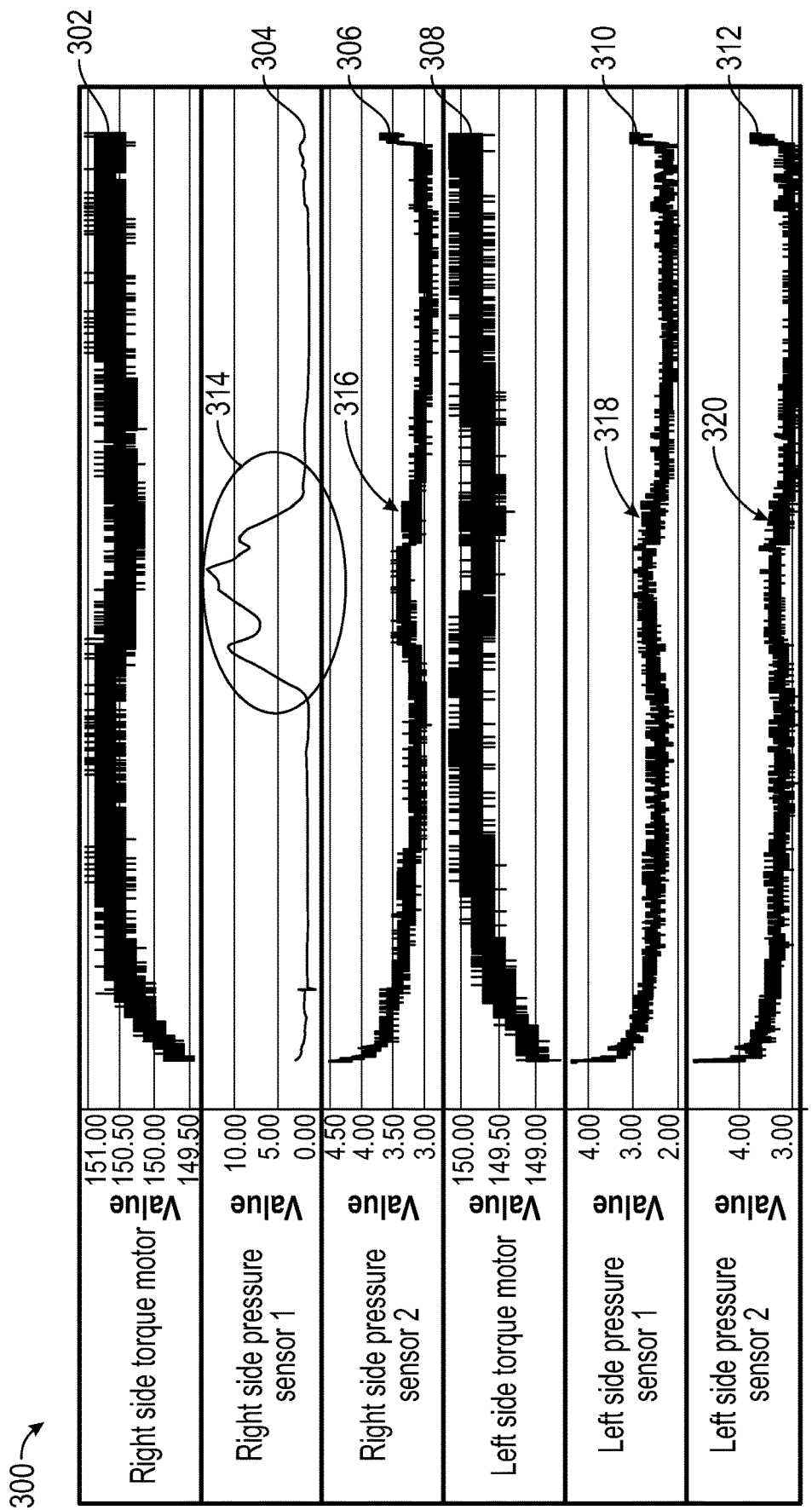
FIG. 3 is a set of graphs depicting parameters that may be associated with a faulty pressure sensor compared with parameters that may be associated with a non-faulty pressure sensor.

Referring to FIG. 3, a set of graphs 300 depicting parameters that may be associated with a faulty pressure sensor compared with parameters that may be associated with a non-faulty pressure sensor. For example, a first set of parameters may include right torque data 302 representing current through a torque motor in a right-side aircraft engine (e.g., the first engine 102), first right-side pressure data 304 representing pressure at a first right-side pressure sensor (e.g., the first pressure sensor 104), and second right-side pressure data 306 representing pressure at a second right-side pressure sensor (e.g., the second pressure sensor 106). A second set of parameters may include left side torque data 308 representing current through a torque motor in a left side aircraft engine (e.g., the second engine 112), first left-side pressure data 310 representing pressure at a first left-side pressure sensor (e.g., the third pressure sensor 114), and second left-side pressure data 312 representing pressure at a second left-side pressure sensor (e.g., the fourth pressure sensor 116).

As shown in FIG. 3, the first right side pressure data 304 may be substantially different than the second right side pressure data 306. For example, the first right side pressure data 304 may include steep peaks 314 where a corresponding portion 316 of the second right side pressure data 306 includes only a mild peak with a much smaller magnitude. Further, the second right side pressure data 306 may include some variability as compared to the first right side pressure data 304 which is smoother. The differences between the first right side pressure data 304 and the second right side pressure data 306 may be indicative of water, or another liquid, being present within the first right side pressure sensor.

In contrast to the first set of set of parameters, the second set of parameters may be indicative of non-faulty sensors. For example, the first left side pressure data 310 and the second left side pressure data 312 may have a substantially similar shape as shown by the matching peaks 318, 320. However, the first left side pressure data 310 and the second left side pressure data 312 may be offset along the y-axis by a substantially constant value.

Because two functioning pressure sensors within a single engine typically produce data having approximately the same shape, although offset from each other by a substantially constant pressure amount, a faulty pressure sensor may be detected by analyzing variability in a difference between the data produced by two pressure sensors within an engine. If the difference is relatively constant, then both pressure sensors are likely functioning. If there is variability in the difference, then one of the pressure sensors may be faulty. As such, the methods described herein rely on a variance value (e.g., the variance value 242) that may be based at least partially on a difference between the sensor measurements. For example, the difference between the first right side pressure data 304 and the second right side pressure data 306 is not consistent. Therefore, a variance of the difference would be larger as compared to a variance of a difference between the first left side pressure data 310 and the second left side pressure data 312.

The operation of a torque motor may also affect the difference between pressure sensors in an aircraft engine anti-ice system. In order to control for the difference, a variance of the left torque motor data 308 and a variance of the right torque motor data 302 may be calculated. The variance of the difference between the first right side pressure data 304 and the second right side pressure data 306 may be divided by a variance of the right torque motor data 302. Likewise, the variance of the difference between the left side pressure data 310 and the second left side pressure data 312 may be divided by a variance of the left torque motor data 308.

Figure 4:
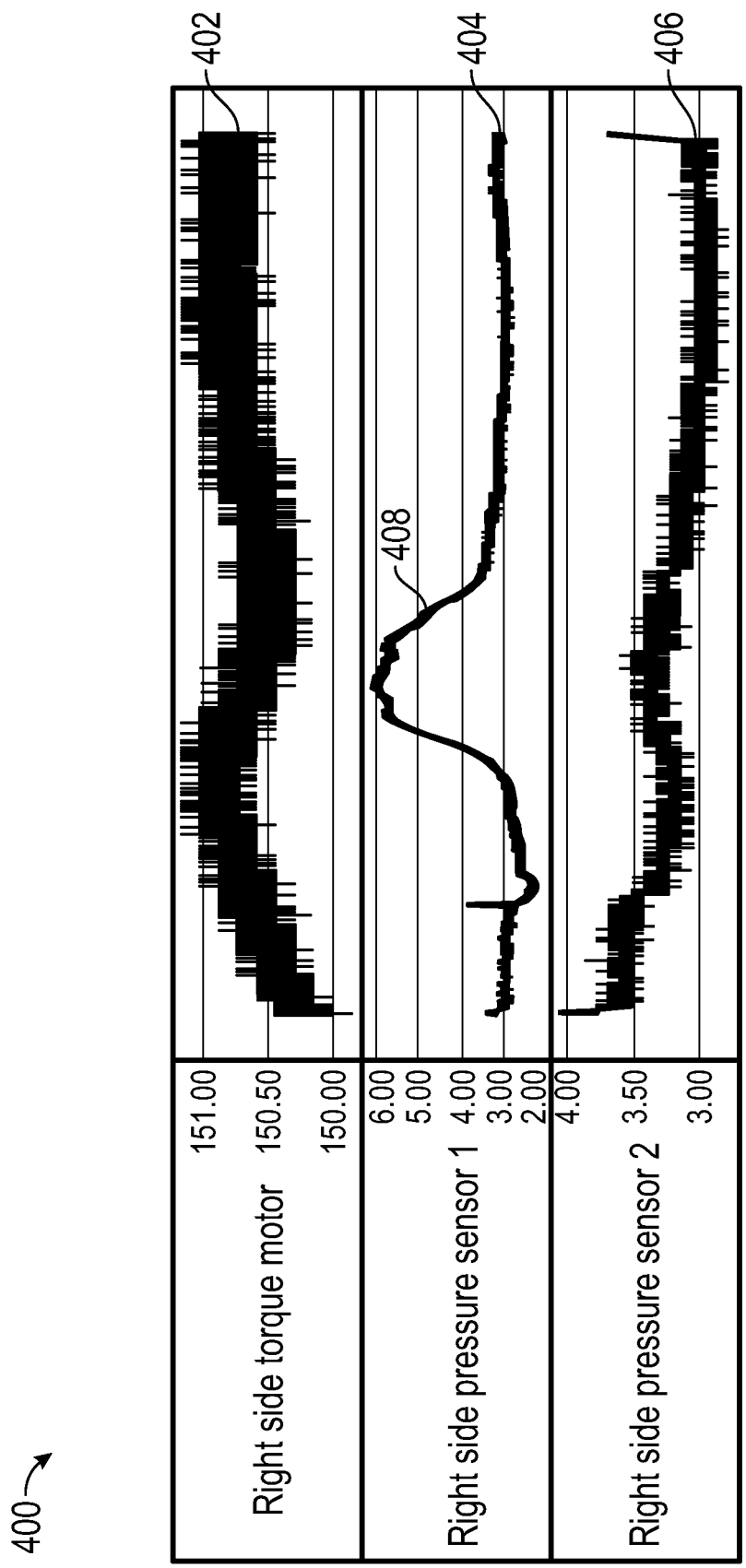
FIG. 4 is a set of graphs depicting a set of parameters that may be associated with a faulty pressure sensor.

Data retrieved from a faulty pressure sensor may take several forms. For example, FIG. 4 is a set of graphs 400 depicting a set of parameters that may be associated with a faulty pressure sensor. The parameters may include torque data 402, first pressure data 404, and second pressure data 406. Given the difference between the first pressure data 404 and the second pressure data 406, the first pressure data 404 may be indicative of a fault in a pressure sensor. As shown in FIG. 4, a slight change in the second pressure data 406 may be associated with a significant peak 408 in the first pressure data 404. The peak 408 may occur mid-flight as shown in FIG. 4, but may also occur at other times, as described with reference to FIGS. 5 and 6.

Figure 5:
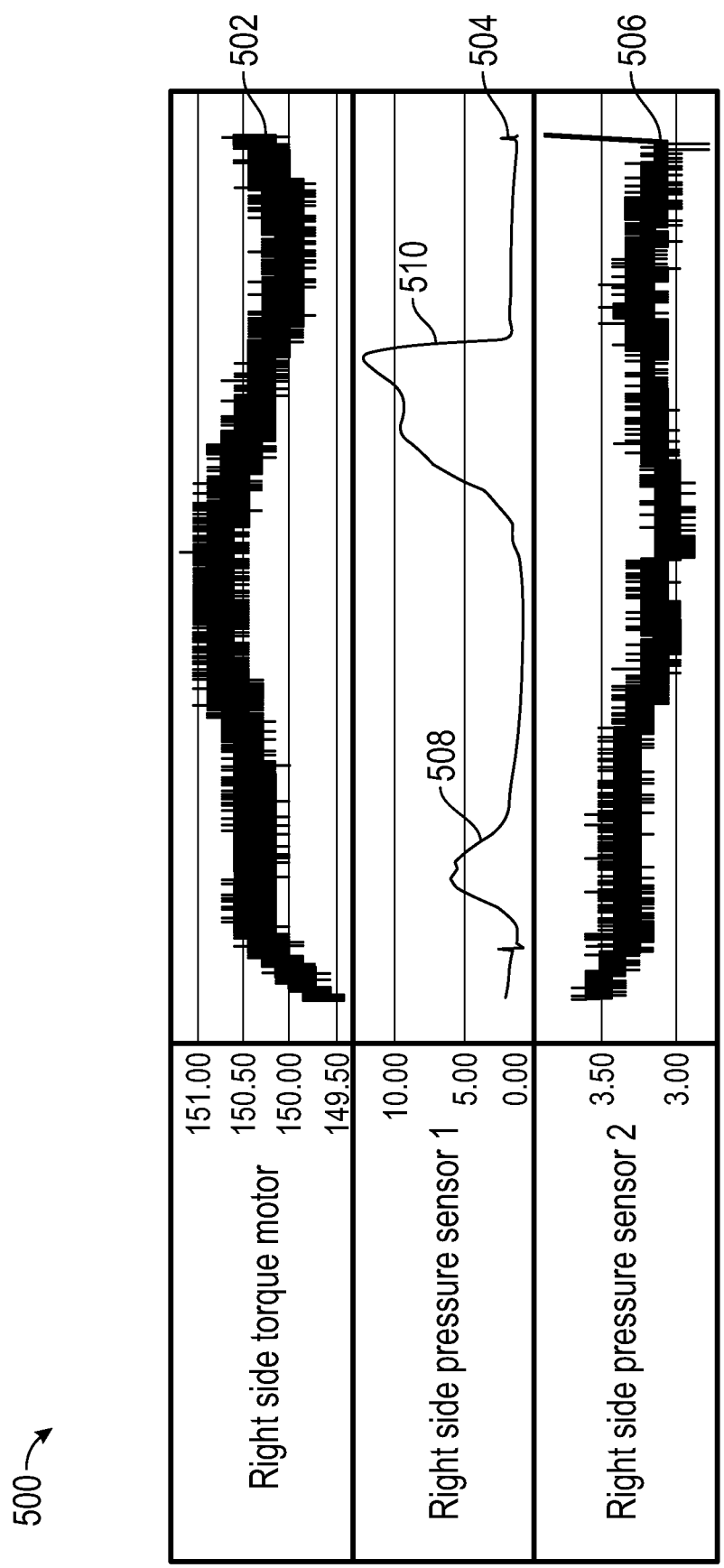
FIG. 5 is a set of graphs depicting a set of parameters that may be associated with a faulty pressure sensor.

FIG. 5 depicts a set of graphs 500 depicting a set of parameters that may be associated with a faulty pressure sensor. The parameters may include torque data 502, first pressure data 504, and second pressure data 506. The first pressure data may include multiple peaks 508, 510 that may occur mid-flight. The multiple peaks 508, 510 may result in a substantial change in the difference between the first pressure data 504 and the second pressure data 506.

Figure 6:
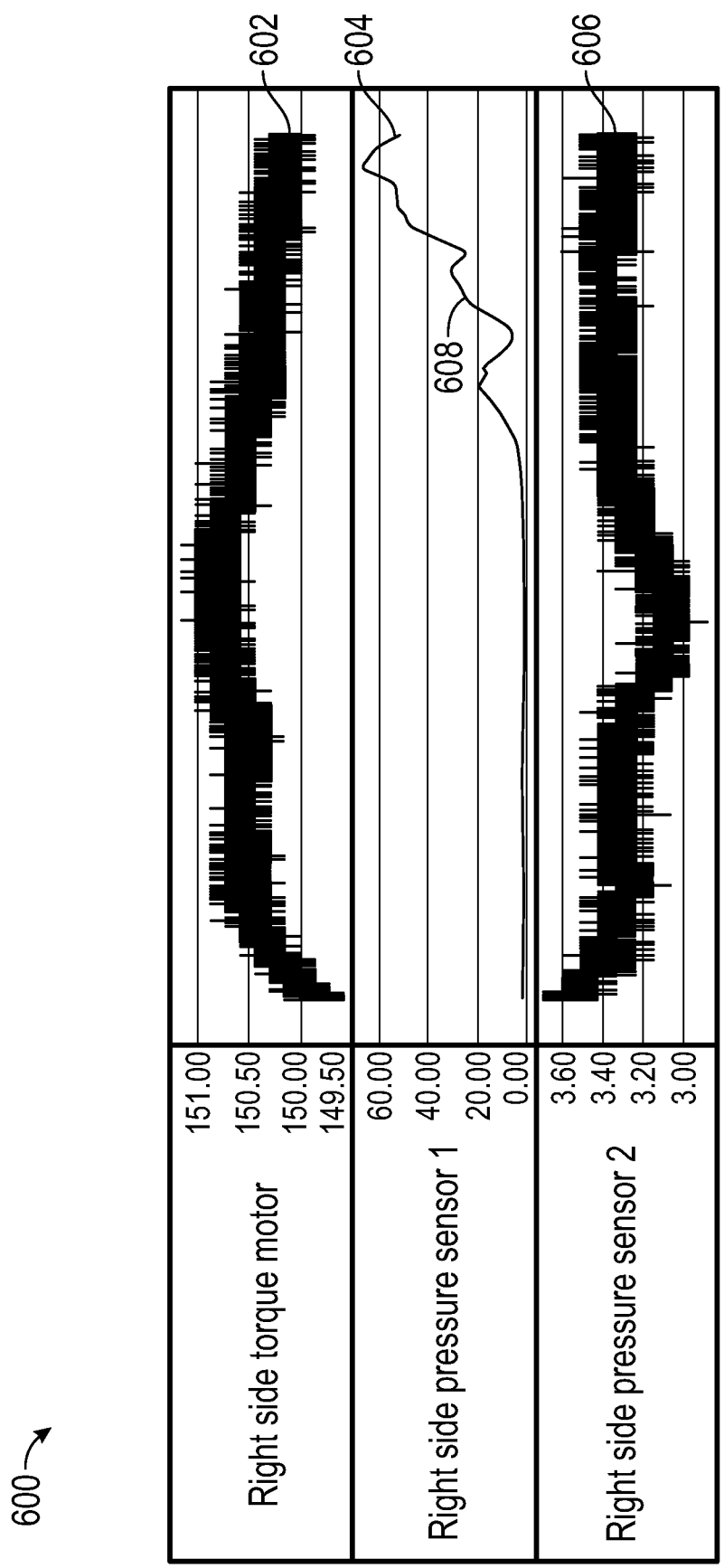
FIG. 6 is a set of graphs depicting a set of parameters that may be associated with a faulty pressure sensor.

FIG. 6 depicts a set of graphs 600 depicting a set of parameters that may be associated with a faulty pressure sensor. The parameters may include torque data 602, first pressure data 604, and second pressure data 606. The first pressure data may include a peak 608 that occurs at near the end of a flight, which may result in a substantial change in the difference between the first pressure data 604 and the second pressure data 606.

Figure 7:
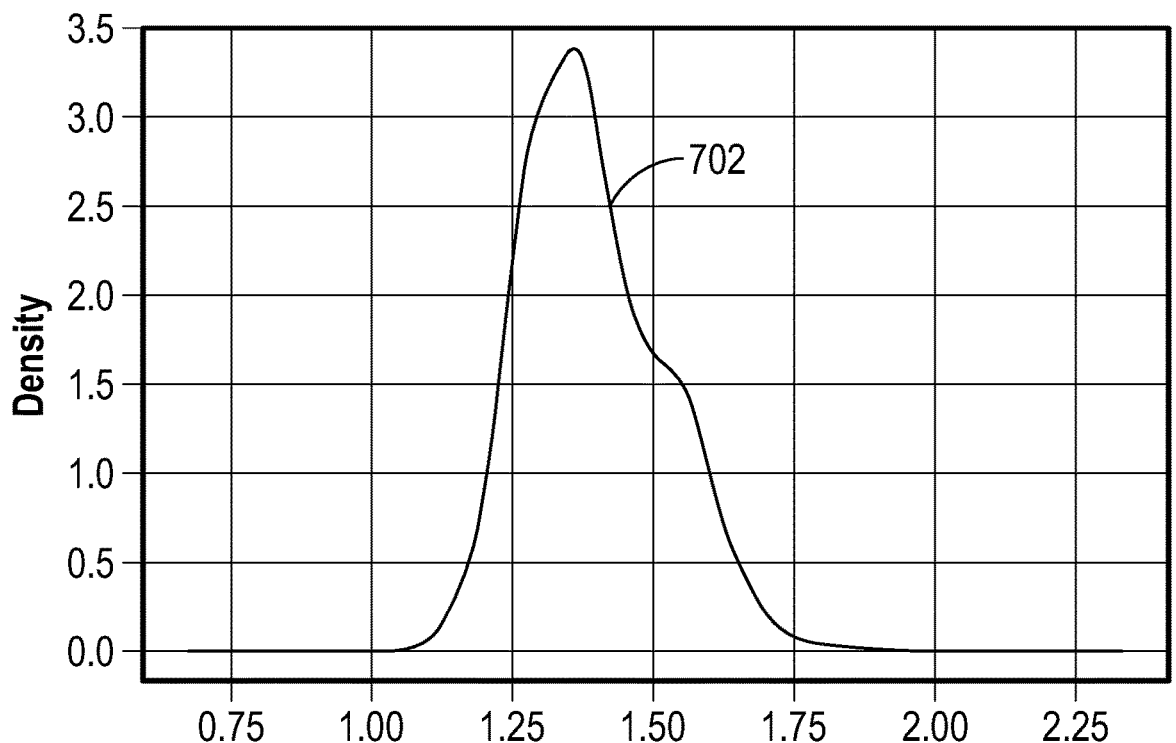
FIG. 7 is a graph depicting a pressure difference distribution that may be associated with a non-faulty sensor.
Figure 8:
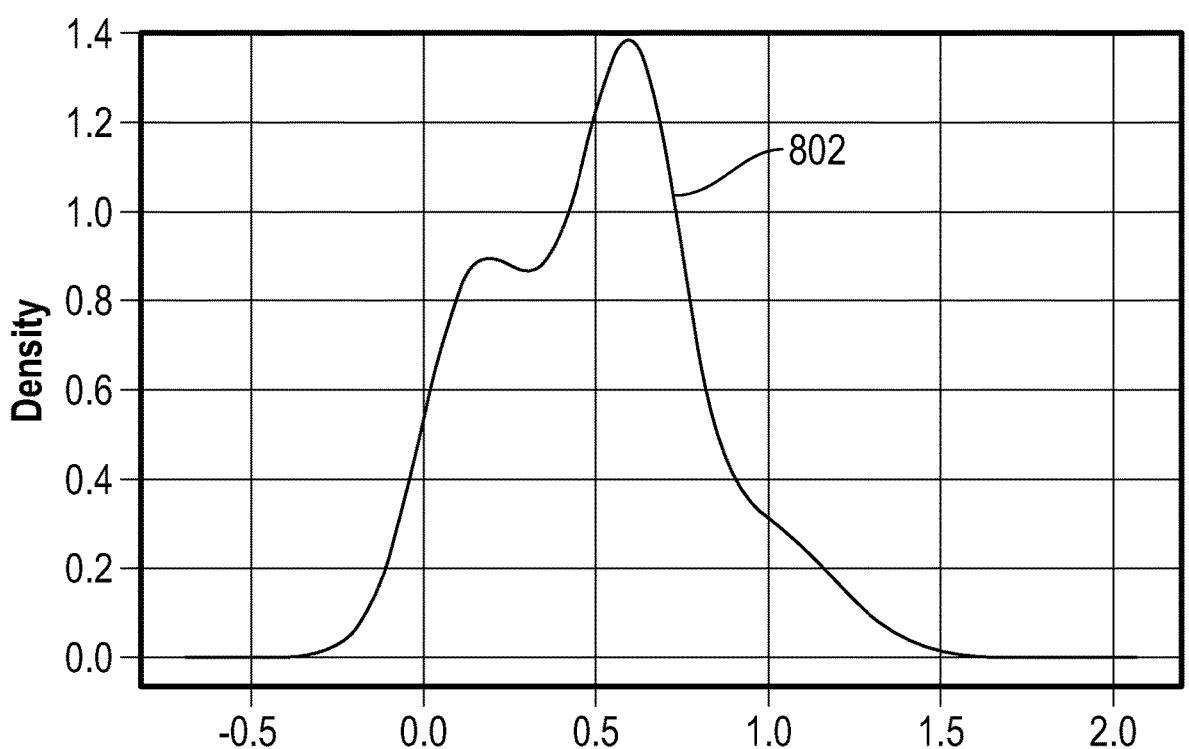
FIG. 8 is a graph depicting a pressure difference distribution that may be associated with a non-faulty sensor.

FIG. 7 is a graph depicting a pressure difference distribution 702 that may be associated with a non-faulty sensor. As shown in FIG. 7, a difference between a first pressure sensor and a second pressure sensor may be primarily distributed between 1.00 and 1.75 psi. FIG. 8 is a graph depicting another pressure difference distribution 802 that may be associated with a non-faulty sensor. A difference between a first pressure sensor and a second pressure sensor corresponding to FIG. 8 may be primarily distributed between −0.5 and 1.5 psi. In both cases, the differences are primarily distributed within a range of 2 psi.

Figure 9:
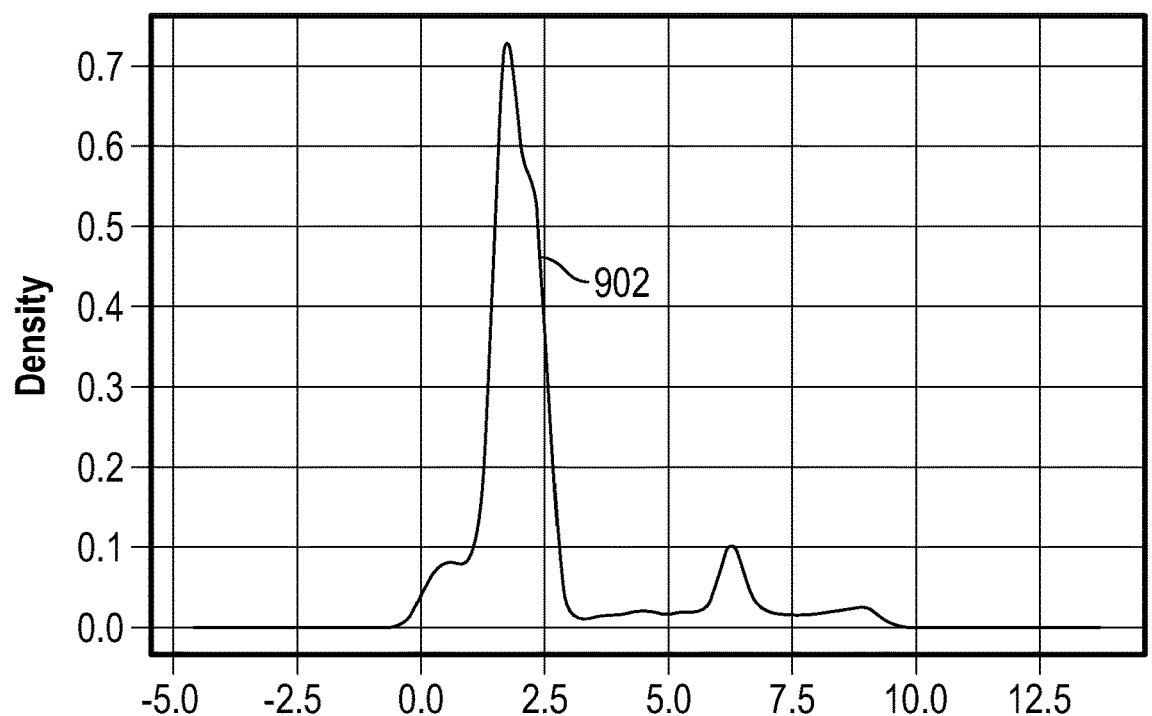
FIG. 9 is a graph depicting a pressure difference distribution that may be associated with a faulty pressure sensor.
Figure 10:
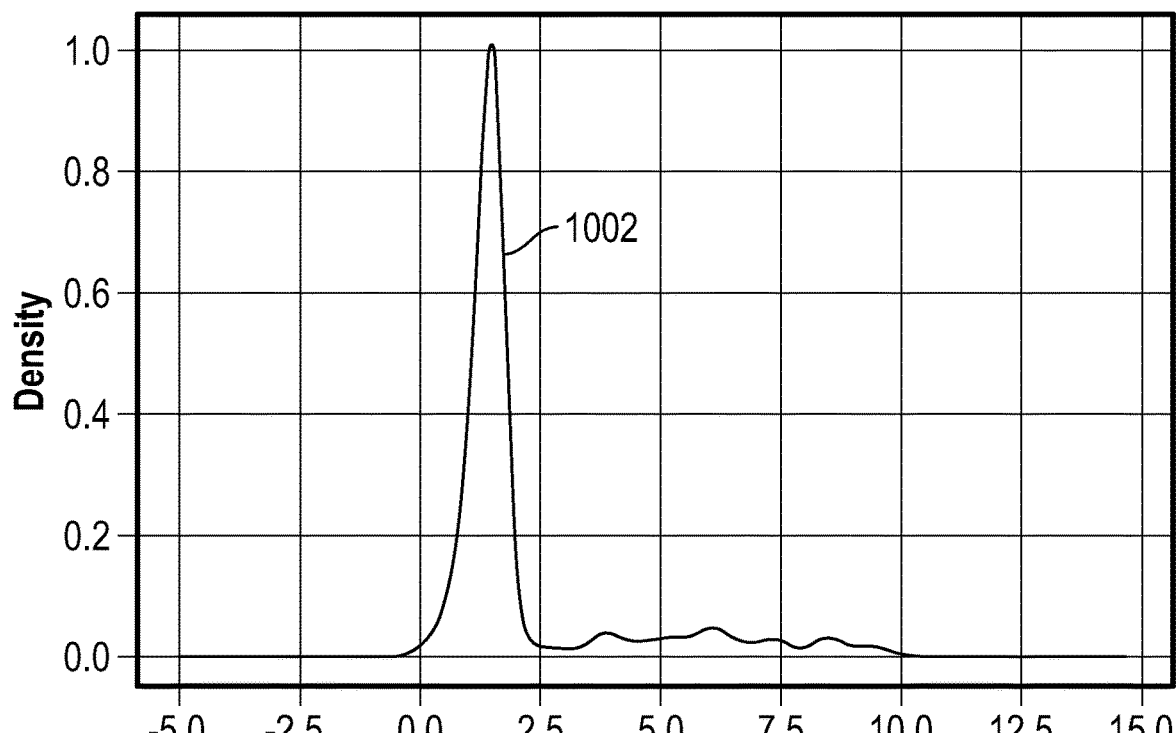
FIG. 10 is a graph depicting a pressure difference distribution that may be associated with a faulty pressure sensor.

FIG. 9 is a graph depicting a pressure difference distribution 902 that may be associated with a faulty pressure sensor. As shown in FIG. 9, a difference between a first pressure sensor and a second pressure sensor may be broadly distributed, falling between 0.00 and 10.0 psi. FIG. 10 is a graph depicting another pressure difference distribution 1002 that may be associated with a faulty pressure sensor. A difference between a first pressure sensor and a second pressure sensor corresponding to FIG. 10 may be broadly distributed between 0.0 and 10.0 psi. In both cases, the differences are distributed between a range of 10 psi, which translates to a much greater variance as compared to FIGS. 7 and 8.

Figure 11:
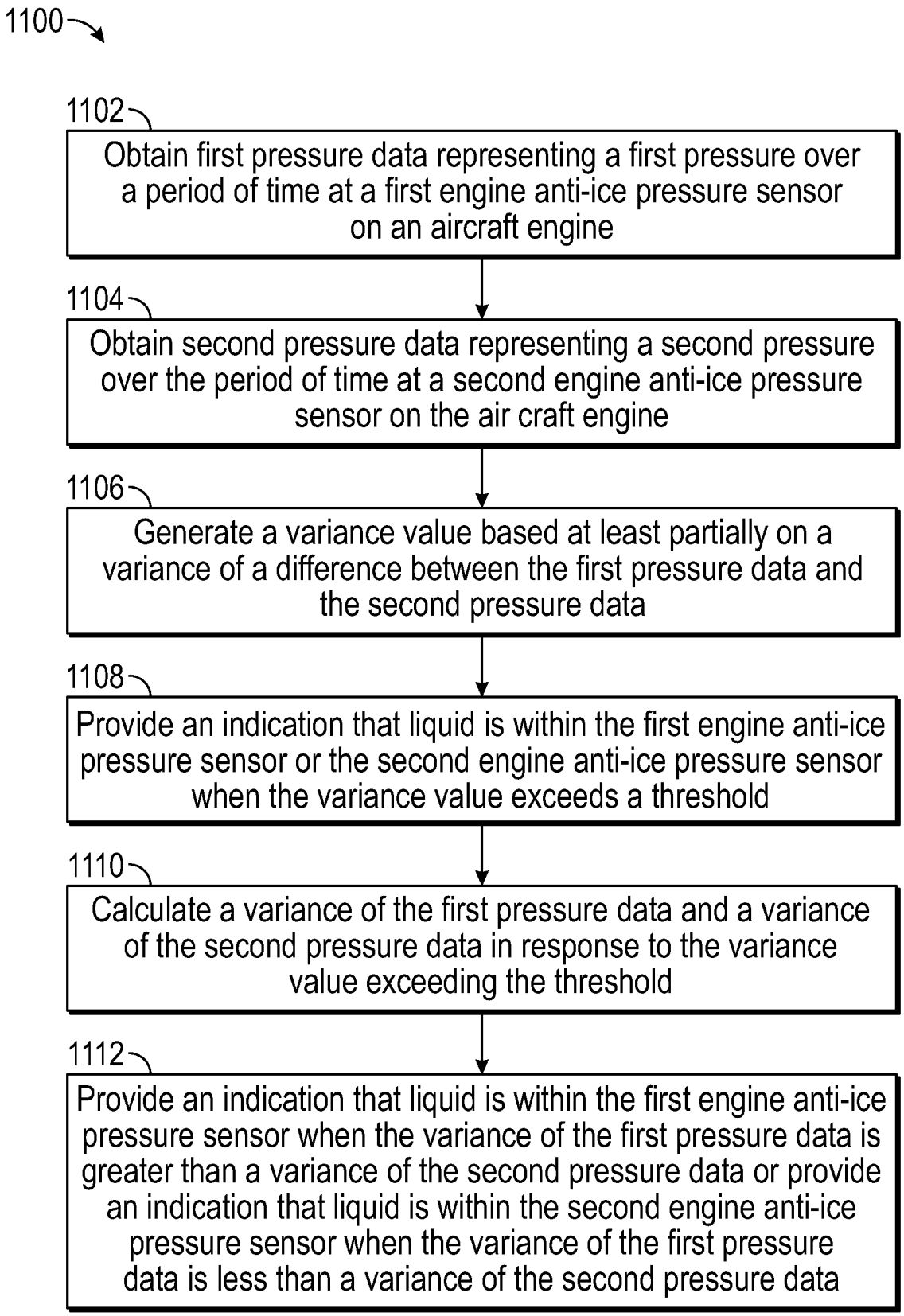
FIG. 11 is a flow chart depicting an embodiment of a method for detecting a faulty engine anti-ice sensor.

Referring to FIG. 11 an embodiment of a method 1100 for detecting a faulty engine anti-ice sensor is depicted. The method 1100 may include obtaining first pressure data representing a first pressure over a period of time at a first engine anti-ice pressure sensor on an aircraft engine, at 1102. For example, the first pressure data 230 may be obtained from the first pressure sensor 204.

The method 1100 may further include obtaining second pressure data representing a second pressure over the period of time at a second engine anti-ice pressure sensor on the aircraft engine, at 1104. For example, the second pressure data 232 may be obtained from the second pressure sensor 206.

The method 1100 may also include generating a variance value based at least partially on a variance of a difference between the first pressure data and the second pressure data, at 1106. For example, the variance value 242 may be generated at least partially on a variance of the difference 237 between the first pressure data 230 and the second pressure data 232.

The method 1100 may include providing an indication that liquid is within the first engine anti-ice pressure sensor or the second engine anti-ice pressure sensor when the variance value exceeds a threshold, at 1108. For example, the indication 250 may be provided to a user via the output device 209.

The method 1100 may further include calculating a variance of the first pressure data and a variance of the second pressure data in response to the variance value exceeding the threshold, at 1110. For example, the first variance 246 and the second variance 248 may be calculated, when the variance value 242 exceeds the threshold variance 244.

The method 1100 may also include providing an indication that liquid is within the first engine anti-ice pressure sensor when the variance of the first pressure data is greater than a variance of the second pressure data or providing an indication that liquid is within the second engine anti-ice pressure sensor when the variance of the first pressure data is less than a variance of the second pressure data, at 1112. For example, the indication 250 may indicate that liquid is within the first pressure sensor 204 or the second pressure sensor 206.

A benefit of the method 1100 is that by analyzing the data received from pressure sensors a faulty pressure sensor may be isolated, thereby reducing maintenance costs and downtime associated with troubleshooting faulty sensors. Other advantages may exist.

Although various embodiments have been shown and described, the present disclosure is not so limited and will be understood to include all such modifications and variations as would be apparent to one skilled in the art.

What is claimed is:

1. A method comprising:
    obtaining first pressure data representing a first pressure over a period of time at a first pressure sensor on an aircraft engine;
    obtaining second pressure data representing a second pressure over the period of time at a second pressure sensor on the aircraft engine;
    generating a variance value based at least partially on a variance of a difference between the first pressure data and the second pressure data; and
    providing an indication that the first pressure sensor or the second pressure sensor is faulty when the variance value exceeds a threshold.

2. The method of claim 1, further comprising:
    calculating a first variance of the first pressure data and a second variance of the second pressure data in response to the variance value exceeding the threshold; and
    providing an indication that the first pressure sensor is faulty when the first variance is greater than the second variance or providing an indication that the second pressure sensor is faulty when the first variance is less than the second variance.

3. The method of claim 1, wherein generating the variance value comprises:
    generating pressure difference data representing the difference between the first pressure data and the second pressure data over the period of time.

4. The method of claim 3, wherein generating the variance value comprises:
    generating a pressure difference distribution for the period of time based on the pressure difference data.

5. The method of claim 1, wherein generating the variance value comprises:
    obtaining torque motor data representing current through a torque motor over the period of time; and
    dividing a variance of the difference between the first pressure data and the second pressure data by a variance of the torque motor data.

6. The method of claim 1, further comprising:
    generating the first pressure data and the second pressure data during a cruise portion of a flight.

7. The method of claim 6, wherein generating the first pressure data and the second pressure data comprises:
    sampling the first pressure at the first pressure sensor and sampling the second pressure at the second pressure sensor at one second intervals.

8. The method of claim 1, wherein the first pressure data and the second pressure data omit at least the first 3 minutes of a cruise portion of a flight.

9. The method of claim 1, further comprising:
    before providing the indication that the first pressure sensor or the second pressure sensor is faulty, determining whether electrical current through a torque motor exceeds a threshold current for the period of time.

10. The method of claim 1, further comprising:
    before providing the indication that the first pressure sensor or the second pressure sensor is faulty, determining whether the first pressure data, the second pressure data, or both include a timestamp error.

11. A system comprising:
    a processor; and
    a memory storing instructions that, when executed by the processor, cause the processor to:
    store first pressure data at the memory, the first pressure data representing a first pressure over a period of time at a first pressure sensor on an aircraft engine;
    store second pressure data at the memory, the second pressure data representing a second pressure over the period of time at a second pressure sensor on the aircraft engine;
    generate a variance value based at least partially on a variance of a difference between the first pressure data and the second pressure data; and provide an indication that the first pressure sensor or the second pressure sensor is faulty when the variance value exceeds a threshold.

12. The system of claim 11, wherein the instructions further cause the processor to: calculate a first variance of the first pressure data and a second variance of the second pressure data in response to the variance value exceeding the threshold; and provide an indication that the first pressure sensor is faulty when the first variance is greater than the second variance or provide an indication that the second pressure sensor is faulty when the first variance is less than the second variance.

13. The system of claim 11, wherein to generate the variance value the instructions further cause the processor to:

obtain torque motor data representing current through a torque motor over the period of time; and divide the variance of the difference between the first pressure data and the second pressure data by a variance of the torque motor data.

14. The system of claim 11, wherein the first pressure data and the second pressure data omit at least the first 3 minutes of a cruise portion of a flight.

15. The system of claim 11, wherein the instructions further cause the processor to: before providing the indication that the first pressure sensor or the second pressure sensor is faulty, determine whether an electrical current through a torque motor exceeds a threshold current for the period of time.

16. The system of claim 11, wherein the instructions further cause the processor to:

before providing the indication that the first pressure sensor or the second pressure sensor is faulty, determine whether the first pressure data, the second pressure data, or both include a timestamp error.

17. A method comprising:

obtaining first pressure data from a first engine anti-ice pressure sensor on a first side of an aircraft engine;

obtaining second pressure data from a second engine anti-ice pressure sensor on the first side of the aircraft engine; and generating a variance value based at least partially on a variance of a difference between the first pressure data and the second pressure data, wherein the variance value exceeding a threshold indicates that the first engine anti-ice pressure sensor or the second engine anti-ice pressure sensor is faulty.

18. The method of claim 17, further comprising:

when the variance value exceeds the threshold, determining a first variance of the first pressure data to determine whether the first engine anti-ice pressure sensor is faulty, and determining a second variance of the second pressure data to determine whether the second engine anti-ice pressure sensor is faulty.

19. The method of claim 17, wherein generating the variance value comprises:

obtaining torque motor data representing current through a torque motor; and dividing a variance of the difference between the first pressure data and the second pressure data by a variance of the torque motor data.

20. The method of claim 17, wherein the first pressure data and the second pressure data correspond to a cruise portion of a flight.

* * * * *